United States Patent [19]

Fields et al.

[11] Patent Number: 4,755,711
[45] Date of Patent: Jul. 5, 1988

[54] ELECTRIC LAMP WITH CERAMIC REFLECTOR

[75] Inventors: Larry R. Fields, Winchester; George B. Kendrick; Merle E. Morris, both of Lexington, all of Ky.

[73] Assignee: GTE Products Corporation, Danvers, Mass.

[21] Appl. No.: 882,325

[22] Filed: Jul. 7, 1986

[51] Int. Cl.[4] .......................... H01J 61/30; H01K 1/34
[52] U.S. Cl. .................................... 313/111; 313/113; 313/579; 362/215
[58] Field of Search .................. 313/111, 113, 25, 579, 313/580; 362/215, 296, 310, 311, 341, 346

[56] References Cited

U.S. PATENT DOCUMENTS

| | | | |
|---|---|---|---|
| Re. 30,832 | 12/1981 | La Giusa | 313/113 |
| 2,108,286 | 2/1938 | Godley | 362/215 |
| 4,041,344 | 8/1977 | La Giusa | 313/113 |
| 4,169,238 | 9/1979 | English et al. | 313/113 X |
| 4,197,480 | 4/1980 | Ryan, Jr. | 313/113 X |
| 4,302,699 | 11/1981 | Keeffe et al. | 313/229 |
| 4,321,504 | 3/1982 | Keeffe et al. | 313/214 |
| 4,331,901 | 5/1982 | de Vrijer et al. | 313/315 |
| 4,454,450 | 6/1984 | English et al. | 313/620 |
| 4,473,872 | 9/1984 | Puckett et al. | 362/309 |
| 4,480,212 | 10/1984 | Monahan et al. | 313/113 X |
| 4,484,254 | 11/1984 | Puckett et al. | 362/309 |
| 4,506,316 | 3/1985 | Thiry et al. | 362/309 |

*Primary Examiner*—David K. Moore
*Assistant Examiner*—Sandra L. O'Shea
*Attorney, Agent, or Firm*—Lawrence R. Fraley

[57] ABSTRACT

An electric lamp of compact, rugged design capable of high temperature operation in such applications as down lighting, display lighting, track lighting, etc. The lamp includes a ceramic reflector having therein a capsule (e.g., tungsten halogen or arc discharge) which serves as the lamp's light source. A base member of conventional external design is secured to the reflector to enable positioning of the lamp in existing socket configurations. At least one part of the capsule engages the internal surface of the reflector's central opening to assure stabilization of the capsule. The lamp further includes a cover which is capable of outward flexing during lamp operation.

15 Claims, 3 Drawing Sheets

ELECTRIC LAMP WITH CERAMIC REFLECTOR

TECHNICAL FIELD

The invention relates to electric lamps and particularly to electric lamps for use in such applications as down lighting, display lighting, flood lighting and track lighting.

BACKGROUND

Typically, two types of electric lamps have been utilized in the above applications. One such lamp, referred to in the art as a PAR (parabolic aluminized reflector) type lamp, typically utilizes a glass reflector and separate glass cover in which is positioned a coiled tungsten filament. A base member secured to the reflector is designed for being positioned within the required socket to provide the necessary connection to a power source (e.g., 120 VAC) for lamp operation. Examples of such lamps are illustrated in U.S. Pat. Nos. 4,506,316 (Thiry et al), 4,484,254 (Puckett et al) and 4,473,872 (Puckett et al), all of which are assigned to the same assignee as the instant invention.

A second type of lamp of this variety includes a quartz or high silica glass envelope having therein a coiled tungsten filament and also including a base member located on the envelope, the base designed for being positioned within a socket as mentioned above. Lamps of this type are referred to in the lighting field with such product designations as R20 (the R standing for reflector), R30, R40, ER30 (the ER standing for ellipsoidal reflector) and ER40. Examples of such lamps are illustrated in U.S. Pat. Nos. 4,041,344 (LaGiusa), Re. 30,832 (LaGiusa) and 4,331,901 (Vrijer et al).

While lamps of the above type do provide what are considered adequate illumination levels to the subject area, effective pattern control of this illumination is deemed inadequate. In addition, such lamps are considered to be relatively large (e.g., some having a bulb diameter exceeding four inches) and thus typically require the occupancy of correspondingly large volumes in their final environment (e.g., within a fixture), in turn requiring a large housing or the like to accommodate same. With particular regard to the latter type lamps (e.g., ER30), these lamps are also considered to be readily susceptible to damage (e.g., during handling) due to the relatively thin nature of their glass envelopes.

DISCLOSURE OF THE INVENTION

It is, therefore, a primary object of this invention to enhance the electric lamp art by providing an electric lamp which is highly efficient, of rugged construction, and is compact in design.

It is another object of this invention to provide such a lamp which can be cost effectively produced on a mass production basis.

It is still another object of this invention to provide such a lamp which can be readily utilized in existing socket and/or housing arrangements.

In accordance with one aspect of the invention, there is provided an electric lamp which includes a ceramic reflector having a forward, concave reflecting portion including a reflecting surface thereon and a rear, protruding neck portion, the ceramic reflector including an opening therein extending through the neck portion, and a light-emitting capsule located within the reflector and including a bulb portion oriented substantially within the reflector's concave reflecting portion and substantially surrounded by the reflecting surface and a sealed end portion of elongated configuration oriented within the opening within the neck portion. The capsule includes a light source within the bulb portion and a pair of electrical conductors electrically coupled to the source and projecting from the sealed end portion. The invention further includes a base member secured to the rear neck portion of the ceramic reflector about the exterior thereof, the base member including first and second electrical contact portions, each of these being electrically coupled to a respective one of the electrical conductors of the capsule.

BEST MODE FOR CARRYING OUT THE INVENTION

For a better understanding of the present invention together with other and further objects, advantages and capabilities thereof, reference is made to the following disclosure and appended claims in connection with the above-described drawings.

Figure 1:
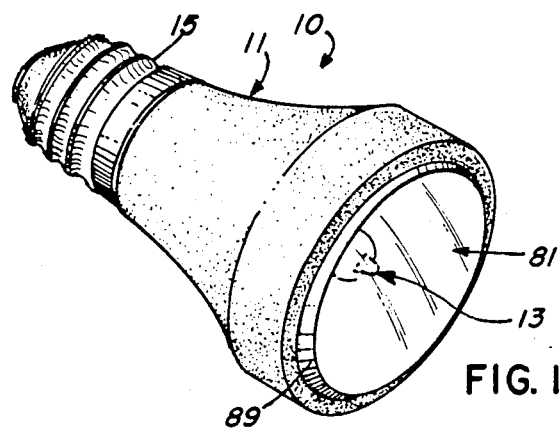
FIG. 1 is a perspective view of an electric lamp in accordance with a preferred embodiment of the invention.

With particular attention to FIG. 1, there is shown an electric lamp 10 in accordance with a preferred embodiment of the invention. As will be understood herein, lamp 10 is highly efficient and of compact, rugged design. That is, the lamp of the invention is specifically designed for being of relatively small construction while capable of providing light output at levels comparative to the aforementioned, known lamps.

Figure 2:
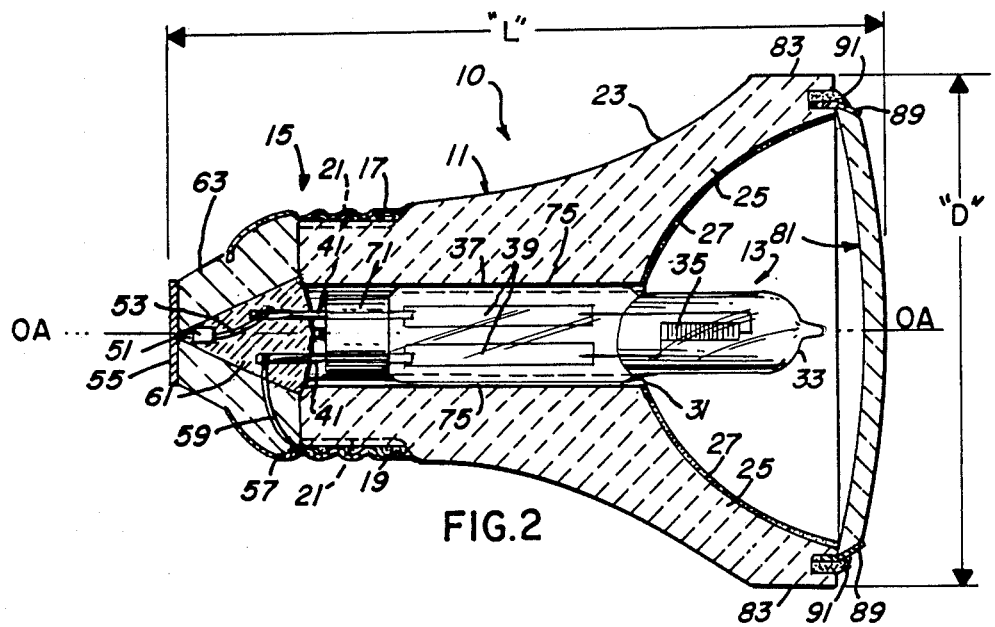
FIG. 2 is an enlarged side elevational view, in section, of the lamp of FIG. 1.

In comparing FIGS. 1 and 2, lamp 10 is shown to include a ceramic reflector 11, a light-emitting capsule 13 located within reflector 11, and a base member 15 which is secured to reflector 11 and adapted for being positioned within an appropriate socket (not shown) which in turn is electrically coupled to the power source (e.g., 120 VAC) for providing electrical energy to the invention. Base member 15 is preferably of substantially similar external configuration to known bases utilized in lamps of the type described herein such that the invention is readily adaptable for use within existing socket constructions. In the example illustrated in the drawings, base member 15 preferably possesses an external configuration similar to existing screw bases similar to those employed in the aforementioned PAR, R, and ER lamps. This is not meant to limit the invention, however, in that other types of bases are readily capable of being used in the invention. Examples of such alternative base configurations for base 15 include those of the skirted screw, bayonet and end prong variety.

As shown in FIGS. 1 and 2, base member 15 is positioned on an external surface of the rear, protruding neck portion 17 of reflector 11. Assembly (to be further described in FIG. 3 below) is accomplished by sliding the substantially cylindrically shaped base member onto the similarly configured protruding neck portion 17. Fixed securement is accomplished using a quantity of ceramic adhesive 19 or the like material, or, alternatively, may be provided by other means. One such alternative means is a procedure known as magnetic metalforming wherein an electrical coil is located relative to (about) the base member while the base is positioned on the reflector's neck portion. A pulsed magnetic field is generated from electric current passing through the coil to exert a controllable pressure on the metal base member. High voltage capacitors are discharged through the coil, making this created field extremely intense. The field in turn induces current in the base member, setting up an opposing magnetic field. As a result, high pressures are generated, causing the metallic base to compress and form a tight fit on the reflector's neck.

In the embodiment shown in the drawings, elongated slots 21 (see also FIG. 4) are preferably provided within the reflector's neck portion to accommodate additional quantities of ceramic adhesive and thus provide added securement of base member 15. Alternatively (i.e., using the aforementioned metalforming technique), the neck portion's external surface may be substantially smooth and thus devoid of slots such as depicted in the drawings.

As stated, reflector 11 is of ceramic construction and thus capable of withstanding relatively high temperatures at which the instant invention is specifically designed for operating. By way of example, reflector temperature for electric lamp 10 during operation thereof exceeded 250 degrees Celsius and in one instance (wherein the capsule 13 operated at 100 watts), the corresponding reflector temperature approached 350 degrees Celsius. The ability to operate at such relatively high temperatures in a safe and facile manner to provide light output at levels similar to those of the aforementioned type lamps constitutes a significant feature of the instant invention, particularly considering the overall compact design thereof. By way of example, lamp 10, in one embodiment, possessed an overall length of only about 2.14 inch (dimension "L" in FIG. 2) and an overall outer diameter of only about 2.00 inch (dimension "D" in FIG. 2).

As specifically shown in FIG. 2, reflector 11 further includes a forward, concave reflecting portion 23 which includes therein the concave reflecting surface 25 designed for reflecting light from capsule 13 during lamp operation. In a preferred embodiment, surface 25 is of substantially parabolic configuration and was glazed during formation of the green ceramic reflector. Surface 25 may also be faceted, fluted, peened or otherwise altered to affect light output. Steatite ceramic powder or other types of ceramic known in the industry, with controlled particle size, is pressed into the desired shape at high pressure (as is known in the industry) to obtain a high density "green" part. Other known methods such as slipcasting or molding a wet slurry may also be used. Liquid glaze is applied, preferably by spraying, onto the area containing the desired contour for the reflective surface while the ceramic is spinning in order to achieve a very precise thin coating. The glaze has been formulated such that it may be sintered to obtain a hard smooth surface at the same time and temperature as required for the ceramic to be sintered and fully cured. Optionally, the outside of the ceramic may be glazed with a clear glaze or with colors, surface finishes and patterns as desired for cosmetic purposes. Colorant may also be added to the ceramic bulk material to produce a final product having such a color.

In addition to the aforementioned glazing of the concave reflecting surface of reflector 11, a metallic reflective coating (27) (e.g., vapor deposited high purity aluminum) is added over the glazed surface after sintering for the purpose of enhancing reflectivity.

Reflector 11 also includes a central opening 31 therein which, as illustrated, passes from the concave reflecting portion 23 to the outer extremity of rear, neck portion 17. As will be described, opening 31 is preferably of substantially cylindrical configuration and lies coaxial with the optical axis (OA-OA) of the reflector. Accordingly, light-emitting capsule 13 is located substantially within opening 31 such that the bulb portion 33 thereof projects within and is substantially surrounded by the concave reflecting surfaces 25 of the reflector. Capsule 13 is preferably tungsten halogen capsule. By a tungsten halogen capsule is meant a capsule wherein the bulb portion thereof includes a coiled (or coiled coil) tungsten filament (35) as the light source and an internal atmosphere containing a halogen, such as bromine. Tungsten halogen lamps are known in the art and operate on a regenerative cycle initiated when a tungsten halide is produced and chemically combines with particles evaporated from the energized filament to thus prevent evaporated tungsten particles from depositing on other filaments (if utilized) or on the envelope wall. Typically, such capsules are constructed of quartz, high silica glass, or aluminosilicate glass. Alternatively, as shown in FIG. 3A, capsule 13 may comprise an arc discharge capsule of the variety shown and described in U.S. Pat. Nos. 4,302,699 (Keeffe et al), 4,321,504 (Keeffe et al) and 4,454,450 (English et al), all of which are assigned to the assignee of this invention. Such lamps are also referred to as low wattage metal halide arc lamps and include a pair of spaced-apart electrodes 2 which extend within the tube (bulb). An arc is created between the electrodes 2 during lamp operation, this arc serving as the light source. Capsules of the arc discharge and tungsten halogen variety typically include a press sealed end portion 37 through which pass at least two electrical conductors which in turn project from the end thereof. Unlike capsules known in the art, however, the capsule of the instant invention includes a press sealed end portion 37 of substantially elongated configuration in comparison to the capsule's bulb portion. By way of example, the capsule envelope in one embodiment of the invention possessed an overall length (dimension "CL" in FIG. 3) of about 1.70 inch and a corresponding seal length (dimension "SL" in FIG. 3) of about 1.05 inch. By elongated is thus meant a capsule having a sealed end length within the range of from about thirty percent to about eighty percent of the overall capsule length.

Located within elongated seal end portion 37 is a pair of elongated conductive foils 39 (e.g., molybdenum) which each serve to interconnect an inner and outer lead portion of one of the respective electrical conductors 41 of the invention. In one example, the outer portions of each of these conductors was comprised of molybdenum material while the corresponding inner portion (that coupled to coiled filament 35) were each of tungsten material. Each conductor 41 is in turn electrically coupled to a respective one of the two electrical contact portions of base member 15. As shown in FIG. 2, one conductor 41 is connected to a diode 51 through a conducting wire 53, which diode is in turn electrically connected to the conductive tip contact portion 55 of base member 15. The remaining conductor 41 is connected to the metallic shell contact portion 57 of the base member, preferably by a wire conductor 59. In a preferred example, the first conductor 53 is preferably of copper material and possesses an outer diameter of about 0.030 inch. The second wire conductor 59 was preferably of three parts (not shown), each of nickel material and butt-welded to form a singular element. The three parts possessed outer diameters of 0.020 inch, 0.006 inch and 0.020 inch, respectively. Wire 59, having this small diameter middle part, thus serves as a fusible element. The outer shell contact portion 57 of base member 15 in one example was of nickel-plated brass, as was the tip contact portion 55. Understandably, solder (not shown) may be utilized in base configurations of this type to provide connections between such elements as disclosed herein.

Preferably, diode 51 is sealed within a quantity of ceramic adhesive 61 or the like which in turn is located within a reservoir portion of electrically insulative material 63 (e.g., glass) which also forms part of base member 15. This ceramic adhesive, which covers the diode, thus serves to insulate this component from heat generated by capsule 13 during lamp operation. In the preferred example, the ceramic adhesive utilized for material 61 was also white in color to thus reflect heat away from the diode. A preferred example of this material is available under the product designation Dylon 07 adhesive, sold by Dylon Industries, Inc., Berea, Ohio 44017.

The purpose of utilizing diode 51 in the invention is to reduce the line voltage. In one example, the aforementioned 120 VAC was reduced to 84 VAC to thus allow a more rugged and efficient tungsten coil. Accordingly, a coil less prone to sag or damage (e.g., during handling) is possible. Potting the diode within the aforementioned white ceramic adhesive, as stated, served to reflect heat from the invention's capsule away from the diode during lamp operation. In one example, a temperature reduction of from about 330 degrees Celsius to about 220 degrees Celsius (e.g., when utilizing the aforementioned 100 watt capsule) was realized. Because the life of a diode is determined to a large extent on its operating temperature, locating the diode in the manner taught herein (within a depression and as far from bulb portion 33 as possible) assures extended life for both the diode and lamp.

Figure 3:
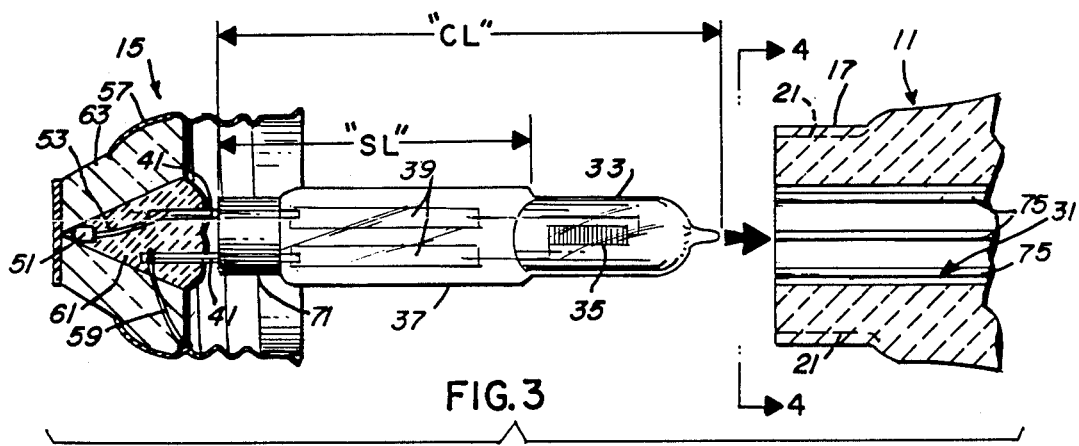
FIG. 3 is an exploded, partial side elevational view of the lamp of FIG. 2, in section, illustrating the preferred technique of positioning the invention's light-emitting capsule within the ceramic reflector thereof.
Figure 3A:
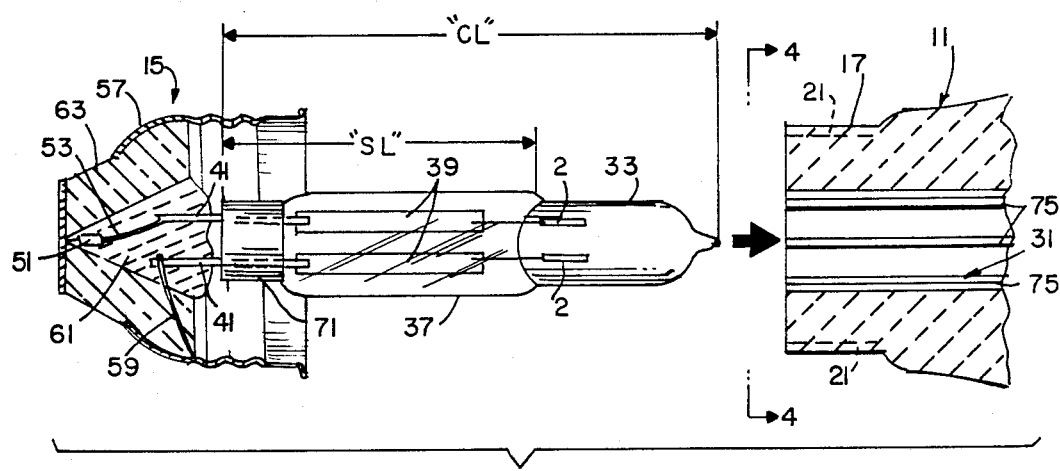
FIG. 3A is another embodiment of the construction shown in FIG. 3 in which the light emitting capsule is an arc tube.

In FIGS. 2 and 3, the elongated sealed end portion 37 of capsule 13 is shown to include a protruding end section 71 which is designed for engaging an internal surface of opening 31 within the reflector's neck portion. Such engagement serves to stabilize the capsule's position within reflector 11 (e.g., during jarring as may occur during handling). In addition, it is preferred that the bulb portion of capsule 13 also engage the reflector opening's internal surface, thus providing a dual contact at spaced-apart locations between capsule and reflector. As shown in FIGS. 2 and 3, protruding end segment 71 and bulb portion 33 are both of cylindrical configuration, each preferably possessing similar outer diameters. The aforementioned sealed portion 37 is of course of flattened configuration and of a width slightly greater than the corresponding outer diameter for the two capsule parts it joins. The above capsule-reflector contact arrangement thus assures a lamp of more rugged construction. In addition, this spaced-apart means of contact facilitates optical alignment of the capsule's filament structure 35 within reflector 11. During assembly, capsule 13 is secured within the base member 15 in the configuration depicted in FIG. 3. That is, the projecting conductors 41 are secured within the heat insulating ceramic adhesive 61 to provide a somewhat rigid capsule and base assembly. This entire assembly is then slidably positioned within the protruding neck portion 17 of reflector 11, as indicated in FIG. 3. During such positioning, the protruding end section 71 and/or cylindrical bulb portion 33 slidably engage the reflector's internal surfaces while the metallic contact portion 57 of the base slidably engages the exterior surface of neck portion 17. Prior to such engagement, the aforementioned adhesive 19, if utilized, is applied (e.g., located within the respective slots 21, if utilized). The final result of this assembly is a capsule (and internal coil) in fixed, optical alignment within the invention's reflector.

The aforementioned assembly technique enables the light center length (the distance from the coiled filament, or, alternatively, the arc location, to the respective reflective surfaces) to be precisely established when the capsule is connected to base member 15. The aforementioned optical alignment is thus possible without further manipulation of the capsule after positioning within the reflector. Extending the length of the press sealed end portion 37 of the capsule has also proven to reduce the seal temperature during lamp operation, thereby extending lamp life. That is, major portions of the sealed end are spaced at a greater distance from the hot bulb portion of the capsule. In one example, a reduced seal temperature of about 100 degrees celsius was observed. It is estimated that such substantial reduction in temperature can improve lamp life by a factor of five when the lamp is operated in the temperature ranges (e.g., at 350 degrees celsius) mentioned above.

Figure 4:
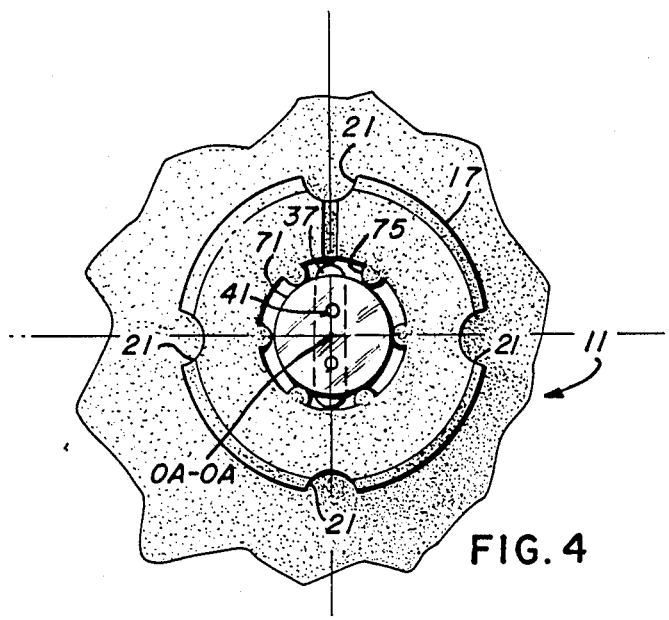
FIG. 4 is a partial end elevational view of the invention's reflector as taken along the line 4—4 in FIG. 3, the invention's capsule being shown therein.

Improved (decreased) heat transference between capsule 13 and reflector 11 in the region of sealed end 17 is attained by the provision of a plurality of longitudinal, upstanding projections 75 which extend substantially along the entire length of opening 31. As shown in FIG. 4, a total of six such projections are utilized, these being equally spaced around the reflector's inner surface. As also shown in FIG. 4, the substantially cylindrically shaped protruding end section 71 of capsule 13 engages these projections when the capsule is fully positioned within the reflector's neck portion 17, the larger width, flattened sealed portion 37 extending between respective pairs of opposed projections. In this regard, it is also possible to utilize a protruding end section 71 (and bulb portion, if desired) of different configuration than the one depicted in the drawings. For example, an oblong configuration can be utilized, such that the exterior surfaces thereof engage fewer (e.g., two) than the total number of projections. Such engagement (with at least two projections) is also possible with an end section and/or bulb portion of cylindrical external configuration. In one instance, for example, only one of the two spaced contacting sections (end section 71 or bulb portion 33) contacted only two projections. Ideally, however, both end section 71 and the bulb engage all (six) of the opening's projections 75 (i.e., as depicted in FIG. 4), provided acceptable tolerances are reached. As understood from the above, a relatively close fit may thus exist between capsule and the inner surfaces of opening 31. When engagement is provided between the capsule and projections as shown herein, the amount of heat transferred directly from the capsule to the ceramic material of reflector 11 is considerably reduced. Excessive heat transference in this region can in turn cause a considerable temperature gradient between the reflector's inner and outer regions, which in turn could place undue stress on the ceramic material and cause cracking or other deformities therein. Accordingly, provision of a multiple point type of contact as taught herein between capsule and reflector, which arrangement in turn provides for a corresponding plurality of air passages between these two components, substantially eliminates this potential problem.

The aforementioned point contact relationships between capsule and reflector has also proven advantageous with regard to the reflective coating 27, when utilized in the invention. That is, this positioning relationship also served to adequately space the capsule from the coating. It was determined that direct contact between capsule and such a coating resulted in sublimation of the coating, the result of which was an adverse effect on the reflector's reflecting capability. This was overcome by the positioning relationship described herein.

Figure 5:
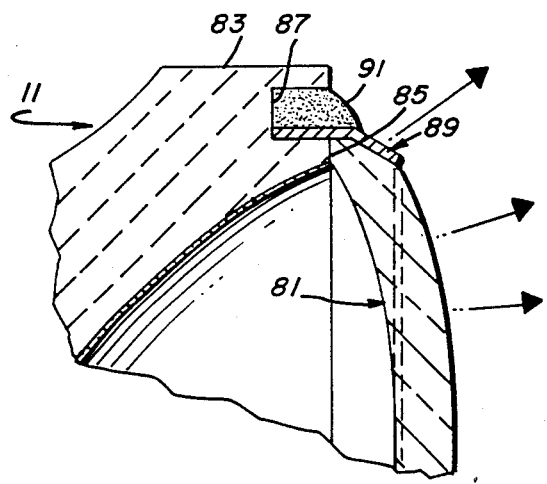
FIG. 5 is an enlarged, partial side elevational view, in section, of the holder member of the invention in accordance with a preferred embodiment thereof.

As seen in FIG. 2, electric lamp 10 may further include a light-transmitting cover means 81 which serves to cover the forward opening of the reflector's concave reflecting portion 23 and thus seal capsule 13 therein. Cover means 81 is preferably of transparent glass material (e.g., borosilicate) and is secured against the forwardmost surfaces of the annular rim portion 83 of reflector 11. In one embodiment, cover means 81 constitute a lens which served to direct the light output in a predetermined manner to provide the ultimate pattern desired on the subject area being so illuminated. If so used, this lens would preferably include a stippled internal surface (not shown) for diffusing light passing therethrough, particularly when the reflector's internal reflecting surface is faceted, peened, or similarly altered as mentioned above. As particularly shown in the much enlarged, fragmented view in FIG. 5, the annular cover means abuts against the aforementioned forwardmost surfaces (85). As also shown, this forwardmost portion of the reflector includes an annular groove or slot 87 therein. Retention of cover means 81 is accomplished by the provision of a holder member 89 which, also being of annular configuration, engages the outer surface of cover means 81 about the periphery thereof. As shown in FIG. 5, holder member 89 is secured within the reflector's groove 81 by a quantity of adhesive 91 (e.g., ceramic adhesive). Holder member 89 is of thin metallic material (e.g., aluminum) and, uniquely, is capable of flexing outwardly (as indicated by the directional arrows in FIG. 5) in response to expansion and contraction of the glass cover 81. Such expansion and contraction occurs due to the substantial difference in coefficients of thermal expansion between the ceramic material for reflector 11 and the preferred material (borosilicate) for cover 81. By way of specific example, in one embodiment of the invention, the ceramic possessed a coefficient of thermal expansion of about $8.00 \times 10^{-6}$ cm./cm./degree Celsius while the borosilicate cover means possessed a coefficient of thermal expansion of about $4.00 \times 10^{-6}$ cm./cm./degree Celsius. The coefficient of thermal expansion for the ceramic adhesive 91 was about $7.50 \times 10^{-6}$ cm./cm./degree Celsius. It is thus understood that the cover means 81 is not cemented to reflector 11 but instead is secured against the reflector in the abutting manner defined. This unique ability of the holder to flex during expansion and contraction of the retained cover prevents damage thereto.

There has thus been shown and described an electric lamp of relatively compact and rugged design capable of illuminating a distant subject area with levels of illumination comparative to those of existing lamp designs. The invention combines the use of a ceramic reflector with a light-emitting capsule to enable high temperature operation without destruction thereof. In addition, the invention provides for the utilization of external base configurations presently known in the art such that the invention can be readily adapted to existing and previous socket designs.

While there have been shown and described what are at present considered the referred embodiments of the invention, it will be obvious to those skilled in the art that various changes and modifications may be made therein without departing from the scope of the invention as defined by the appended claims.

What is claimed is:

1. An electric lamp comprising:
   a ceramic reflector having a forward, concave reflecting portion including a reflecting surface thereon and a rear, protruding neck portion, said ceramic reflector including an opening therein extending through said neck portion;
   a light-emitting capsule located within said reflector and including a bulb portion oriented substantially within said concave reflecting portion and substantially surrounded by said reflecting surface and a sealed end portion of elongated configuration oriented within said opening within said neck portion and including a protruding end section adapted for engaging an internal surface of said neck portion to stabilize said capsule within said reflector, said capsule further including a light source within said bulb portion and a pair of electrical conductors electrically coupled to said light source and projecting from said elongated sealed end portion; and
   a base member secured to said rear neck portion of said ceramic reflector about the exterior thereof, said base member including first and second electrical contact portions, each of said contact portions being electrically coupled to a respective one of said electrical conductors of said light-emitting capsule.

2. The electric lamp according to claim 1 wherein said light-emitting capsule is a tungsten halogen capsule and said light source located within said bulb portion is a coiled tungsten filament.

3. The electric lamp according to claim 1 wherein said light-emitting capsule is an arc discharge capsule having a pair of spaced apart electrodes therein and said light source is an arc created between said spaced apart electrodes during operation of said capsule.

4. The electric lamp according to claim 1 wherein said reflecting surface of said ceramic reflector is glazed.

5. The electric lamp according to claim 4 wherein said reflecting surface further includes a layer of reflective material located on said glazed surface.

6. The electric lamp according to claim 1 wherein said reflector includes a plurality of longitudinal upstanding projections extending through said opening within said rear neck portion, at least said protruding end section or said bulb portion of said capsule engaging at least two of said upstanding projections to provide said stabilization of said capsule, said upstanding projections reducing heat transfer between said capsule and the remainder of said ceramic reflector during operation of said lamp.

7. The electric lamp according to claim 6 wherein both said bulb portion and said protruding end section of said capsule engage said upstanding projections at spaced locations therealong.

8. The electric lamp according to claim 1 further including light-transmitting cover means secured to said forward, concave reflecting portion of said reflector for providing a cover therefor.

9. The electric lamp according to claim 8 wherein said light-transmitting cover means is a lens.

10. The electric lamp according to claim 8 further including a holder member secured to said concave reflecting portion of said reflector for engaging said light-transmitting cover means to retain said cover means against said reflector.

11. The electric lamp according to claim 10 wherein said light-transmitting cover means possesses a coefficient of thermal expansion substantially greater than the coefficient of thermal expansion of said ceramic reflector, said holder member flexing during expansion and contraction of said cover means during operation of said electric lamp to substantially prevent damage to said cover means caused by said expansion and contraction.

12. The electric lamp according to claim 10 wherein said holder member comprises an annular metallic rim.

13. The electric lamp according to claim 1 further including a diode interconnecting one of said electrical conductors of said light-emitting capsule and said respective electrical contact portion of said base member.

14. The electric lamp according to claim 13 wherein said diode is oriented within said base member, said base member including a quantity of heat insulative material substantially covering said diode to shield said diode from the heat generated by said capsule during operation thereof.

15. The electric lamp according to claim 14 wherein said heat insulative material is a ceramic adhesive material.

* * * * *